United States Patent [19]

Makita

[11] Patent Number: 5,107,405
[45] Date of Patent: Apr. 21, 1992

[54] MOTOR VEHICLE HEADLAMP

[75] Inventor: Hiroyuki Makita, Shizuoka, Japan

[73] Assignee: Koito Manufacturing Co., Ltd., Tokyo, Japan

[21] Appl. No.: 747,576

[22] Filed: Aug. 20, 1991

[51] Int. Cl.⁵ .............................................. B60Q 1/04
[52] U.S. Cl. ..................................... 362/61; 362/221; 362/265
[58] Field of Search ................... 362/61, 80, 263, 265, 362/221

[56] References Cited

U.S. PATENT DOCUMENTS

| | | | |
|---|---|---|---|
| 4,714,986 | 12/1987 | Wurster | 362/263 X |
| 4,897,767 | 1/1990 | T'Jampens | 362/263 X |
| 4,920,459 | 4/1990 | Rothwell, Jr. et al. | 362/263 X |

Primary Examiner—Stephen F. Husar
Attorney, Agent, or Firm—Sughrue, Mion, Zinn, Macpeak & Seas

[57] ABSTRACT

A motor vehicle headlamp with a discharge lamp as its light source in which electromagnetic noise produced by the discharge lamp or by the glow switch starter and which leaks out of the headlamp is eliminated. A lighting circuit unit is provided which includes a casing on the inner surface of which an electrically conductive layer is formed for shielding electromagnetic noise, and a lighting circuit for the discharge bulb accommodated in the casing and coupled to the rear end portion of a lamp body. In another embodiment, the rear end portion of a lamp body, on the inner surface of which an electrically conductive grounding layer is formed, is formed into a noise shielding chamber closed with a partition board capable of blocking electromagnetic noise, and a lighting circuit for the discharge bulb is accommodated in the noise shielding chamber.

15 Claims, 1 Drawing Sheet

MOTOR VEHICLE HEADLAMP

BACKGROUND OF THE INVENTION

The present invention relates to a motor vehicle headlamp having a discharge lamp as its light source.

Recently, in the motor vehicle lamp industry, extensive research has been conducted on employing a discharge lamp as a light bulb for a motor vehicle lamp, specifically, a discharge lamp which is excellent both in light emission efficiency and output light spectrum characteristics, and which has a long service life.

However, the employment of a discharge lamp is disadvantageous in that, in order to operate the discharge lamp, it is necessary to provide a separate lighting circuit for applying a high voltage across the electrodes of the discharge lamp. Also, electromagnetic noise is produced by a glow switch starter in the lighting circuit or by the discharge lamp itself, which can adversely affect other electrical components of the vehicle.

SUMMARY OF THE INVENTION

In view of the foregoing, an object of the invention is to provide a motor vehicle headlamp with a discharge lamp as its light source in which electromagnetic noise produced by the discharge lamp or by the glow switch starter and which leaks out of the headlamp is eliminated.

In order to achieve the aforementioned and other objects of the invention, in a motor vehicle lamp according to the invention, a lighting circuit unit is provided which comprises a casing on the inner surface of which an electrically conductive layer is formed for shielding electromagnetic noise, and a lighting circuit for the discharge bulb accommodated in the casing and coupled to the rear end portion of a lamp body.

In another embodiment of the invention, the rear end portion of a lamp body, on the inner surface of which an electrically conductive grounding layer is formed, is formed into a noise shielding chamber closed with a partition board capable of blocking electromagnetic noise, and a lighting circuit for the discharge bulb is accommodated in the noise shielding chamber.

In the motor vehicle headlamp of the invention, electromagnetic noise produced by the glow switch starter in the lighting circuit or lines connected to the latter is blocked by the grounded conductive layer formed on the inner surface of the lighting circuit unit, that is, the electromagnetic noise thus produced is prevented from leaking out of the lighting circuit unit.

Moreover, because electromagnetic noise produced by the glow switch starter in the lighting circuit or the lines connected to the latter is blocked by the grounded conductive layer formed on the inner surface of the noise shielding chamber, the electromagnetic noise is prevented from leaking out of the noise shielding chamber. Furthermore, the grounded conductive layer formed on the inner surface of the lamp body blocks the electromagnetic noise produced by the discharge bulb and the current supplying lines connected to the latter, thereby preventing the leakage of electromagnetic noise from the headlamp.

DESCRIPTION OF THE PREFERRED EMBODIMENTS

Preferred embodiments of the invention now will be described with reference to the accompanying drawings.

Figure 1:
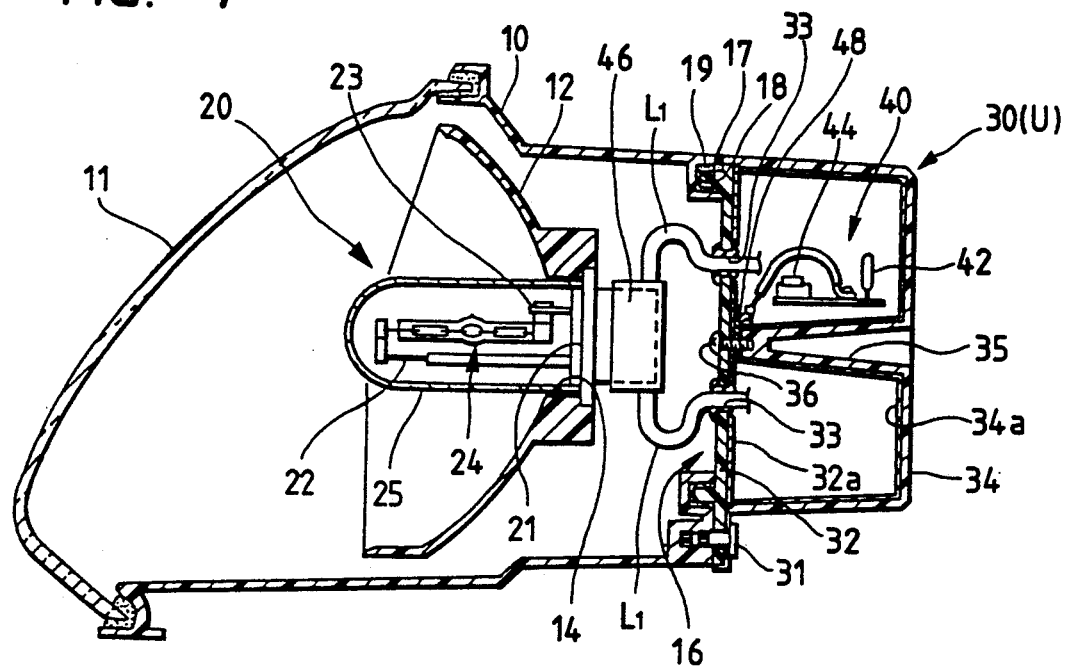
FIG. 1 is a longitudinal sectional view showing a motor vehicle lamp constructed in accordance with a first embodiment of the invention.

FIG. 1 is a sectional view showing a motor vehicle headlamp of a first embodiment of the invention. In FIG. 1, reference numeral 10 designates a container-shaped lamp body, in which a reflector 12 in the form of a paraboloid is supported by an aiming mechanism (not shown). A discharge bulb 20 is fitted in a bulb insertion hole 14 formed in the rear end portion of the reflector 12. In the discharge bulb 20, a pair of lead supports 22 and 23 different in length extend forwardly from an insulating base 21 to support a discharge lamp 24 at both ends. An ultraviolet-ray shielding globe 25 is secured to the base 21 in such a manner as to surround the discharge lamp 24. Further in FIG. 1, reference numeral 11 designates a lens covering the front opening of the lamp body 10.

A lighting circuit accommodating casing 30, which includes a lighting circuit 40 for the discharge bulb, is secured to the rear end portion of the lamp body. An opening 16 is formed in the portion of the lamp body 10 which corresponds in position to the bulb inserting hole 24, and a sealing groove 18 is formed in the periphery of the opening 16. The lighting circuit accommodating casing 30 has a sealing leg 17 which is engaged with the sealing groove 18 through a sealing agent 19. The lamp body 10 and the casing 30 are combined together with fastening members 31 at several points. The lamp body is made of synthetic resin. During manufacture, by heating the fastening members 31 and then pushing them into the lamp body 10 so as to fuse the two, the latter 10 is made integral with the casing 30.

The lighting circuit accommodating casing 30 is formed of a plate-shaped base 32 made of synthetic resin, and a container-shaped cover 34 combined with the plate-shaped base 32. Electrically conductive layers 32a and 34a are formed on the inner surfaces of the light circuit accommodating casing 30 by plating or coating with electrically conductive materials such as Cu, Ni and Zn. The lighting circuit 40, which is arranged inside the casing 30, operates to apply high voltage to the discharge bulb 20 to effect a steady and continuous discharge operation.

The lighting circuit 40 includes a bi-metallic type glow switch starter 42 for applying high voltage to the discharge lamp 24, and a ballast for effecting a continuous, stable discharge operation. A pair of electrodes of the glow switch starter 42 are connected to a pair of lead wires $L_1$, which extend through insertion holes 33 formed in the base 32 into the lamp body 10. The lead wires are connected through a connector 46 to the discharge bulb 20. A cover reinforcing boss 35 protrudes from the cover 34 (which is a part of the casing 30) in such a manner that it can be brought into contact with the base 32.

A fastening screw 36 is screwed through the base 31 into the end portion of the boss 35 so that the base 32 is positively combined with the cover 34. The fastening screw 36 is connected to the ground terminal 48 of the lighting circuit 40 so that, during the discharge operation of the glow switch starter, electromagnetic noise produced by the lighting circuit is grounded out through the conductive layers 32a and 34a formed on the inner surfaces of the casing 30. That is, the difficulty is eliminated of electromagnetic noise produced by the glow switch starter 42 adversely affecting other electrical devices installed on the vehicle such as a radio.

On the other hand, when electromagnetic noise is produced around the headlamp, the noise will be blocked by the conductive layers 32a and 34a; that is, the noise will not affect the lighting circuit 40 in the casing 30 at all.

The lighting circuit 40 is accommodated in the casing 30, which is detachably engaged with the lamp body 10; that is, the casing 30 including the lighting circuit 40 defines a lighting circuit unit U. Hence, a test of the lighting circuit 40 can be performed independently of the headlamp. That is, the electromagnetic noise shielding effect can be determined quickly.

Due to the above-described construction of the headlamp, the lighting circuit unit and the headlamp unit can be assembled on different assembly lines, and the lighting circuit unit and the headlamp unit subsequently combined together. That is, the headlamp can be manufactured with high efficiency.

In the above-described first embodiment, the base 32 and the cover 34 of the casing 30 are made of synthetic resin, and the inner surfaces thereof are plated or coated with an electrical conductive material However, the base 32 may be formed by die-casting an electrically conductive material such as SPC, Al or Zn, and the cover 34 also may be formed by diecasting such an electrically conductive material.

Figure 2:
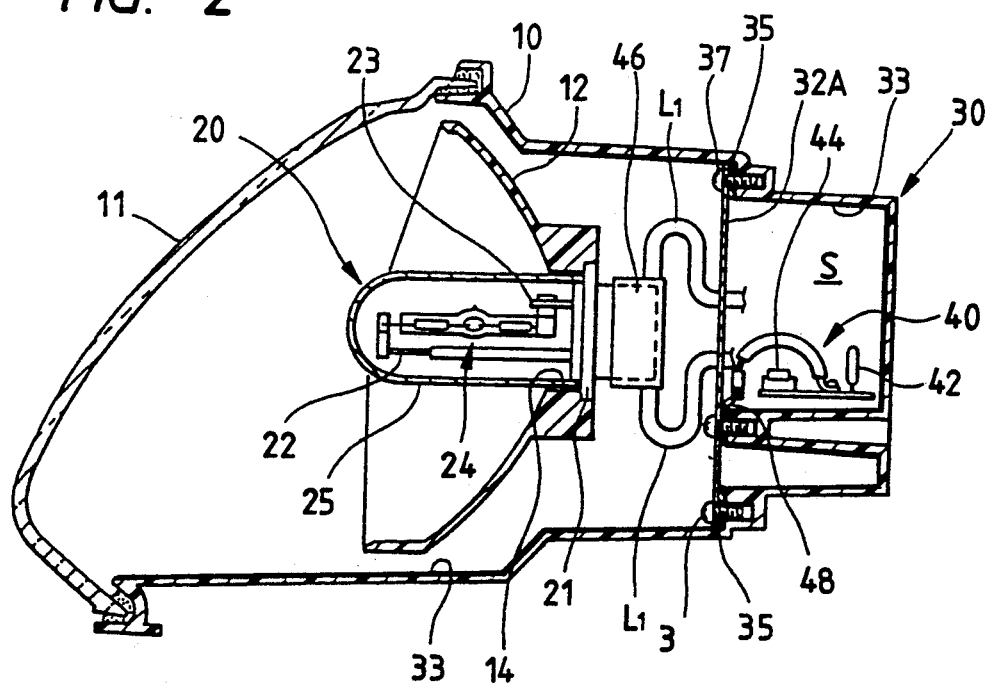
FIG. 2 is also a longitudinal sectional view showing a motor vehicle lamp constructed in accordance with a second embodiment of the invention.

FIG. 2 is a longitudinal sectional view of a headlamp of a second embodiment of the invention.

In the first embodiment described above, the lighting circuit unit is connected to the rear wall of the lamp body. On the other hand, a specific feature of the second embodiment resides in that a noise shielding chamber is formed inside the lamp body 10 in such a manner that the former is integral with the latter. That is, the lamp body is formed so as to have a rear chamber defined therein to accommodate the lighting circuit.

After the lighting circuit 40 is arranged in the rear end chamber, the rear end chamber is closed with a partition board 32A of SPC; that is, the aforementioned noise shielding chamber S is formed. In FIG. 2, reference numeral 33 designates an electrically conductive layer formed on the inner surfaces of the noise shielding chamber S by plating or coating with an electrically conductive material such as Cu, Ni or Zn; 35, a packing of electrically conductive rubber held between the partition board 32 and the noise shielding chamber S; and 37, fixing screws for securing the partition board 32A. The remaining components are the same as those in the first embodiment, and are thus designated by the same reference numerals or characters.

In the second embodiment, electromagnetic noise produced by the lighting circuit 40 during the discharge operation of the glow switch starter 42 is grounded out through the conductive layer 33 and the partition board 32A; that is, the electromagnetic noise produced, for instance, by the glow switch starter 42 is blocked by the noise shielding chamber S. The electromagnetic noise produced by the discharge bulb 20 and by the current supplying lines connected to the latter are blocked by the electrically conductive layer 33 surrounding the discharge bulb and the current supplying lines. That is, the motor vehicle headlamp of the invention is free from the difficulties of the electromagnetic noise produced when the discharge bulb 20 is turned on adversely affecting other electrical devices, and the lighting circuit being affected by eleotromagnetic noise produced outside the headlamp.

In the second embodiment, the partition board 32A is preferably made of SPC; however, it may be replaced with a synthetic resin plate covered with a conductive layer 32a, as in the case of the base 32 in the first embodiment.

As is apparent from the above description, in the motor vehicle headlamp of the first embodiment of the invention, the electromagnetic noise produced, for instance, by the glow switch starter in the lighting circuit is blocked by the grounded conductive layer formed on the inner surface of the lighting circuit unit; that is, the electromagnetic noise thus produced is prevented from leaking out of the lighting circuit unit. Hence, the difficulty of the electromagnetic noise produced by the discharge operation of the glow switch starter adversely affecting other electrical devices is eliminated.

In the motor vehicle headlamp of the second embodiment of the invention, the electromagnetic noise produced, for instance, by the glow switch starter in the lighting circuit is blocked by the grounded conductive layer formed on the inner surface of the noise shielding chamber; that is, the electromagnetic noise thus produced is prevented from leaking out of the noise shielding chamber. Furthermore, the grounded conductive layer formed on the inner surface of the lamp body blocks electromagnetic noise produced by the discharge bulb and the current supplying lines connected to the latter. Therefore, the difficulty of electromagnetic noise produced by the bulb when turned on adversely affecting other electrical devices is eliminated.

What is claimed is:

1. A motor vehicle lamp comprising:
   a lamp body;
   a discharge bulb as a light source received in said lamp body; and
   a lighting circuit unit comprising a casing, at least an inner surface of said casing being conductive for shielding electromagnetic noise, and a lighting circuit for said discharge bulb accommodated in said casing, said lighting circuit unit being coupled to a rear end portion of said lamp body.

2. The motor vehicle lamp of claim 1, wherein said casing comprises a sealing leg received in a sealing groove formed in a periphery of an opening formed in a rear portion of said lamp body corresponding to a lamp insertion hole formed in said lamp body.

3. The motor vehicle lamp of claim 1, wherein said lamp body and said casing are held together at a plurality of points by fastening members heat-fused with at least one of said lamp body and said casing.

4. The motor vehicle lamp of claim 1, wherein said casing comprises a plate-shaped base disposed across a rear opening in said lamp body, and a container-shaped cover combined with said base.

5. The motor vehicle lamp of claim 4, wherein said lighting circuit comprises a glow switch starter for applying high voltage to said discharge lamp, and a ballast for continuing a stable discharge operation of said discharge lamp.

6. The motor vehicle lamp of claim 5, wherein said glow switch starter comprises a pair of electrodes connected to a pair of lead wires extending through insertion holes formed in said base to said discharge lamp.

7. The motor vehicle lamp of claim 4, further comprising a cover reinforcing boss protruding from said cover and contacting said base.

8. The motor vehicle lamp of claim 7, further comprising a fastening screw screwed into said base into an end portion of said boss.

9. The motor vehicle lamp of claim 8, wherein said screw is connected to a ground terminal of said lighting circuit.

10. The motor vehicle lamp of claim 4, wherein said base and said cover are made of a synthetic resin having a conductive layer formed in said inner surface.

11. The motor vehicle lamp of claim 10, wherein said conductive layer is formed of a material selected from the group consisting of Cu, Ni and Zn.

12. The motor vehicle lamp of claim 4, wherein said base is die-cast from an electrically conductive material.

13. The motor vehicle lamp of claim 4, wherein both said base and said cover are die-cast from an electrically conductive material.

14. A motor vehicle lamp comprising:
a lamp body, a rear end portion of said lamp body being formed into a noise shielding chamber, an electrically conductive grounding layer being formed on an inner surface of said noise shielding chamber;
a partition board capable of blocking electromagnetic noise closing said noise shielding chamber;
a discharge bulb as a light source received in said lamp body; and
a lighting circuit for said discharge bulb accommodated in said noise shielding chamber.

15. The motor vehicle lamp of claim 14, further comprising a packing of made of an electrically conductive material held between said partition board and said noise shielding chamber.

* * * * *